United States Patent [19]

Escobal

[11] Patent Number: 4,687,494
[45] Date of Patent: Aug. 18, 1987

[54] APPARATUS AND METHOD FOR PUMPING AIR

[76] Inventor: Peter R. Escobal, 607 N. Inglewood Ave., Inglewood, Calif. 90302

[21] Appl. No.: 524,310

[22] Filed: Aug. 18, 1983

[51] Int. Cl.$^4$ ...................... B01D 19/00; B01D 47/02
[52] U.S. Cl. ............................................. 55/37; 55/48; 55/53; 55/87; 55/89; 55/95; 55/196; 210/169; 210/188
[58] Field of Search ................... 55/37, 48, 53, 87, 89, 55/95, 178, 196; 210/169, 188, 195.1, 220, 221.1

[56] References Cited

U.S. PATENT DOCUMENTS

| | | | |
|---|---|---|---|
| 2,086,778 | 7/1937 | Peffer et al. | 55/48 |
| 3,555,783 | 1/1971 | Grimshaw | 55/48 |
| 3,643,403 | 2/1972 | Speece | 55/53 |
| 3,904,393 | 9/1975 | Morse | 210/169 X |
| 4,043,771 | 8/1977 | Anand | 55/95 X |
| 4,045,336 | 8/1977 | Isteri | 55/196 X |
| 4,072,612 | 2/1978 | Daniel | 210/169 |
| 4,100,071 | 7/1978 | Beurer et al. | 55/178 X |
| 4,101,607 | 7/1978 | Bart et al. | 210/169 X |
| 4,192,833 | 3/1980 | Hashimoto et al. | 55/89 X |
| 4,300,919 | 11/1981 | Lewis et al. | 55/48 |

Primary Examiner—Robert Spitzer
Attorney, Agent, or Firm—Poms, Smith, Lande & Rose

[57] ABSTRACT

An apparatus and method for pumping air in which ambient air is mechanically filtered and introduced into a stream of water circulating in a closed path and driven by a water pump, the air-water mixture being directed to an air separation chamber in which the air-water mixture is forceably impinged against one wall of the chamber to cause frothing of the mixture. The frothing mixture rises through a reservoir of water in the closed circulatory path into an air plenum chamber above the water level, the air rising into said plenum chamber being water stripped of pollutants not removed by the mechanical filter. Air collects under pressure in the air plenum chamber, the pressure air being released through a suitable tube or duct and introduced into a tank of water such as an aquarium. Apparatus for pumping air comprising a motor means driving a water pump means having impellers to cause flow of an air-water mixture, air separation means including an outer container and an inner container which receives an air-water mixture from the impellers, the outer container having a closed top wall provided with an outer duct and spaced above the level of the water to provide an air plenum chamber, the water in the outer container being discharged through a pipe means leading to a water accelerator system for aspirating air into the water and for accelerating the flow of water into the impeller chamber of a water pump means.

7 Claims, 3 Drawing Figures

U.S. Patent    Aug. 18, 1987    4,687,494
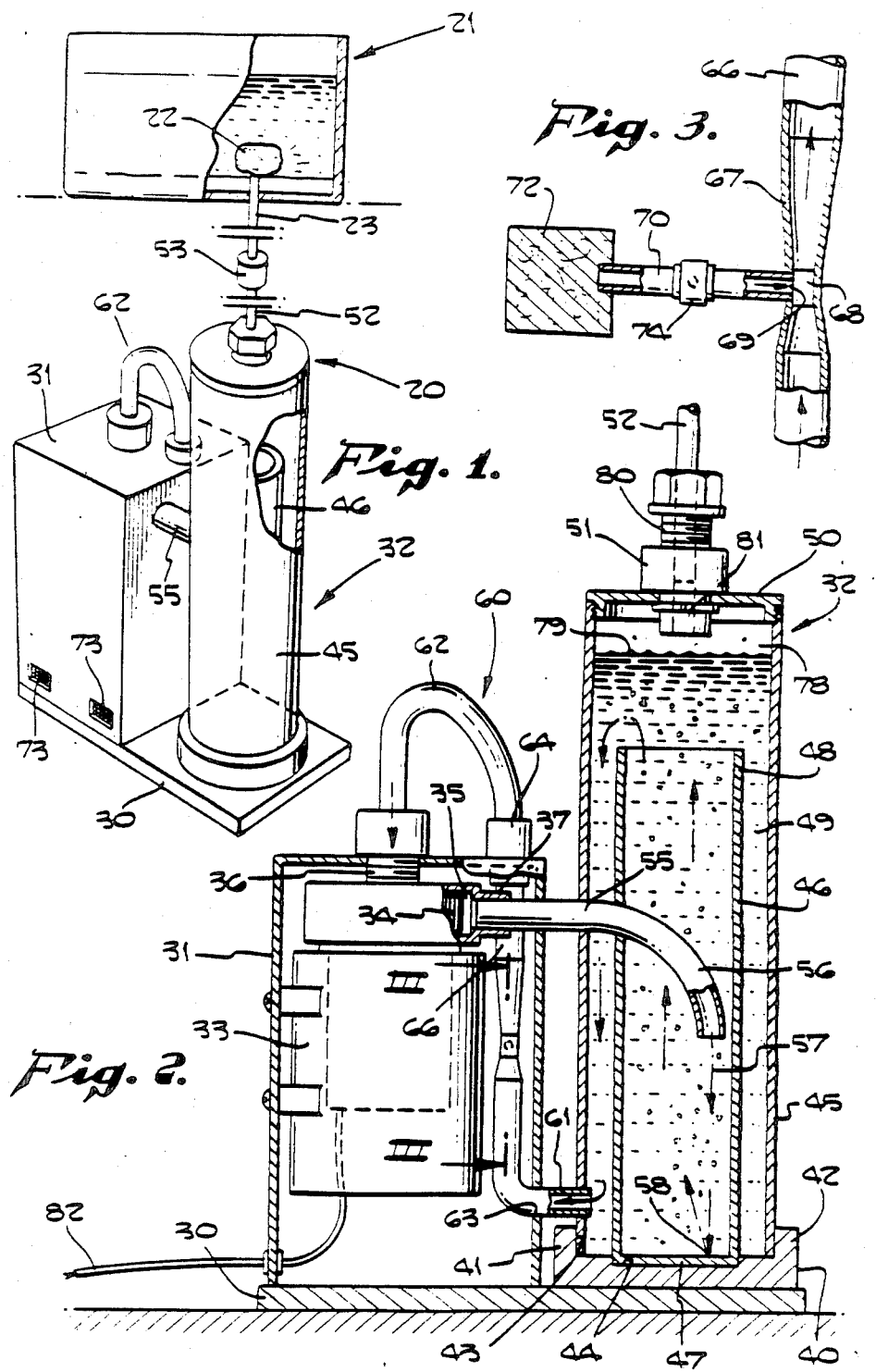

APPARATUS AND METHOD FOR PUMPING AIR

BACKGROUND OF THE INVENTION

Aquariums providing a body of water in a tank for purposes of maintaining marine life and also for aesthetic purposes require aeration of the water to provide additional oxygen for the marine life and to also provide interesting flow patterns of air bubbles which are emitted adjacent the bottom of the tank and rise in irregular paths to the water surface in the tank. Prior proposed air pump means for supplying aeration of water in a tank have included piston type air pumps, bellow type pumps, air pumps utilizing diaphrams, and high speed rotary vanes. Such prior proposed air pumps were so constructed that the air being pumped thereby could be contaminated by the working parts of the air pump. Further, the ambient air which might contain pollutants of dust, foreign particles and chemical pollutants was pumped by such prior proposed air pumps into the water in the aquarium and ultimately polluted the aquarium. Such pollution of an aquarium tank required frequent periodic changing of its water and if the amount of pollutants in the air became very great, the health and well-being of the marine life could be affected. Such prior proposed air pumps were relatively noisy and became a distraction and annoyance if the aquarium tank was part of the decor of a residence.

Such prior proposed air pumps were subjected to wear of moving parts and required continual maintenance and replacement of parts. Further, such prior proposed air pumps for this purpose were limited to pumping against a relatively small amount of water head.

SUMMARY OF INVENTION

The present invention relates to a novel apparatus and method for pumping air and treating such air to provide purified or nonpolluted pressure air for use in an aquarium tank or other body of water or other use requiring clean air.

The main object of the present invention is to provide a novel apparatus and method of providing pressurized air in which pollutants have been removed by mechanical filter means and by passage of such air through water which serves as a fluid medium for transporting such air to an air plenum chamber in which the water surface forms one wall of the chamber.

An object of the present invention is to provide from an ambient air source a quantity of pressure air from which particulate matter has been removed and which has been at least partially purified of non particulate pollutants by passing the air through water or other suitable liquid.

An object of the invention is to provide an apparatus and method for providing pressurized air relatively free of pollutants and having a large volume capacity.

A further object of the invention is to provide an apparatus and method for providing purified pressure air in which the pressure air is adapted to be used against relatively low pressures such as 3 to 15 pounds per square inch depending upon the capacity of the water pumping means.

A more specific object of the present invention is to provide a separation means for separating air from an air-water mixture in which the air introduced into the water is ambient air and in which the introduction of air into the water occurs at an accelerating system which increases the velocity of the flow of water in a closed circulatory system to facilitate the pumping of water and the production of pressure air in an air plenum chamber of the air-separation means.

A specific object of the present invention is to provide separation means for separating a gas from a liquid in which the gas is transported in a closed circulatory liquid system, said separation means including outer receptacle means defining a reservoir chamber for a gas-liquid mixture, an inner receptacle within said chamber having an open top spaced from the top wall of the outer receptacle; and an inlet pipe extending through said walls to the interior of the inner chamber; an outlet port in the wall of said outer receptacle, an outlet fitting for gas in the top wall of said outer receptacle, and means for pumping liquid containing gas into said inner chamber at a flow rate to cause frothing of said gas-liquid mixture and separation of the gas from the liquid into the space below the top wall of the outer receptacle and above the liquid level in the chamber of said outer receptacle whereby gas under pressure is accumulated in said space beneath said top wall, and means are provided for discharging the gas under pressure through the outlet fitting in the top wall of the outer receptacle.

A further specific object of the invention is to provide a method for producing purified pressure air by introducing ambient air into a closed water circulation path, the ambient air being passed through a mechanical filter before introduction into the water path, frothing the air-water mixture in an air-separation means whereby bubbles of air are separated from the water mixture and contained in an air plenum chamber above the surface level of the water, and accelerating the flow of water to aspirate more air into the water.

Another specific object of the invention is to provide in an aeration system for an aquarium, means for introducing filtered ambient air in said system by injection of air into the path of circulating water.

Other objects of the invention include the provision of a compact, lightweight inexpensive air pump means; an air pump means which has long life and in which moving parts are limited to water pumping means, in which contamination from polluted ambient air is restricted to water in a closed circulating system and does not reach the water in the aquarium tank; in which contaminated pumping water may be readily replaced; in which additives may be placed in the pumping water to enhance the oxygen content of the air pumped into the aquarium tank and in which the rate of production of pressure air in the plenum chamber may be readily controlled by regulating the flow rate of the pumping water.

Various other advantages and objects of the present invention will be readily apparent from the following description of the drawings in which an exemplary embodiment of the invention is shown and described.

IN THE DRAWINGS

FIG. 1 is a schematic perspective view of an apparatus for pumping air embodying this invention connected to an aquarium tank for providing aeration of the water in said tank.

FIG. 2 is a sectional view of the air pumping apparatus shown in FIG. 1, the section being taken in a vertical plane generally bisecting the apparatus of FIG. 1.

FIG. 3 is a fragmentary sectional view taken in the plane indicated by line III-III of FIG. 2 and illustrating air inlet means and an accelerating water flow system used in this invention.

DETAILED DESCRIPTION OF THE INVENTION

In FIG. 1 apparatus generally indicated at 20 embodying this invention is shown connected to an aquarium 21 containing a body of water providing an environment for marine life. The aquarium body of water is provided aeration through a stone 22 of porous material which is in communication with an air line 23 connected to apparatus 20. The stone 22 provides for distribution of the air as it emerges from surfaces of stone 22. Aquarium 21 is shown of reduced size for purposes of illustration and apparatus 20 is located externally of the aquarium 21 in any suitable location.

Apparatus 20 may include a base 30 upon which may be mounted in side by side relation a housing 31 and air-water separation means 32. Housing 31 encloses a motor means 33 suitable supported therewithin and provided with impeller means 34 separated and sealed from the motor means. Motor means 33 is preferably a magnetic drive centrifugal motor such as March centrifugal pump Model AC-2CB-MD available in the market. Impeller vane means 34, in this example, are rotated by the motor means about a vertical axis and in an impeller chamber 35 for pumping water circulated into an inlet port 36 and through an outlet port 37.

The air-water separation means 32 may be mounted on an adjacent portion of base 30 by a bottom cap member 40 having a circular wall 41 provided with an upstanding circumferential flange 42 to provide stepped concentric recesses 43 and 44 for reception of and securing the bottom end portions of an outer upright receptacle or container 45 and an inner upright receptacle or tube 46. The inner tube 46 includes a hollow cylindrical member having bottom wall 47 which closes the bottom end of the tube 46 and having an open top end 48. The height of tube 46 is less than the height of outer container 45.

The outer container 45 employs the bottom end cap 40 as a bottom wall and has cylindrical walls of a diameter greater than inner tube 46 to provide an annular space or chamber 49 between the inner tube 46 and outer container 45. The walls of the outer container 45 extend above the top open end 48 of the inner tube. The upper end of container 45 is closed by a top wall 50. An air outlet fitting 51 is carried by top wall 50 for flow of air from the top portion of the outer container 45 into an air line 52 which is suitably connected to the air line 23 at the aquarium. The air line 52 may be provided with a suitable air pressure regulating valve 53 which may also include a check valve to prevent water from the aquarium tank from seeping into the air-separation means.

Pipe means interconnecting the air-separation means 32 and the impeller chamber 35 may include a discharge pipe portion 55 extending from outlet port 37 through the walls of the outer and inner receptacles and having a downwardly curved end portion 56 to discharge pumped water downwardly as indicated by arrow 57 to impinge the water against bottom wall 47 as at 58.

The pipe means also includes an inlet pipe portion 60 which generally extends from an outlet 61 at the bottom of the outer container 45 to provide outlet flow of water from annular chamber 49. Pipe portion 60 at its other end leads into inlet port 36 of impeller chamber 35 as indicated by the upwardly and downwardly curved pipe portion 62. Pipe portion 60 enters housing 31 at 63 and is directed upwardly between the walls of housing 31 and motor means 33 and then leaves housing 31 at an outlet fitting 64. The section 66 of pipe 60 between inlet and outlet 63 and 64 to housing 31 provides an accelerator means for increasing flow of water from the air-water separation means to the impeller chamber 35 and for aspirating air into the stream of water.

As best seen in FIG. 3, pipe section 66 within housing 31 comprises a portion 67 having a restricted throat at 68. In the vicinity of throat 68 an orifice 69 is provided which is connected to an air tube 70. Air tube 70 carries at its outer end a filter means 72 located within housing 31 for mechanically separating dust and other solid particles of particulate from the air which enters tube 70. The air supplied within housing 31, which is filtered by filter means 72, is ambient air which may enter the interior of housing 31 through air vents 73 provided at suitable locations in the walls of housing 31. The accelerated flow of water through the portion 67 aspirates air into the water stream through inlet tube 70 to provide an air-water mixture which flows through pipe portion 60 into impeller chamber 35 and thence through outlet pipe portion 55 to be discharged from pipe portion 56 downwardly against the bottom wall 47 of inner tube 46. A check valve 74 may be provided in the air tube 70 to prevent back flow of water through tube 70, filter means 72, and into the interior of the housing 31.

The air-separation means 32 also includes an air collection and plenum chamber 78 defined by the top wall 50 of the outer container 45, upper side walls of container 45 and the surface 79 of water contained in the air-separation means 32 which provides an active reservoir of water as now described in operation of the apparatus.

To prepare for the air pumping action, air outlet fitting 51 includes a threaded plug 80 which may be unscrewed to open the air outlet 81 at the top of container 45 to permit filling with water or selected liquid the outer container 45, inner container 46, pipe means 60, and the impeller chamber until the level of the water in the outer container reaches a selected level such as at 79 by which a relatively small air space is provided for the air plenum chamber 78. After the apparatus is filled as above described, the threaded plug 80 may be secured and air line 52 connected with line 23 of the aquarium 21. Motor means 33 may be connected by electrical lead 82 to a suitable electrical outlet having switch means to electrically energize motor means 33. Impellers 36 pump the water in the closed water circulation system as above described, the inlet tube portion 60 drawing water from annular chamber 49 of the air-separation means 32. Pipe portion 55 forceably discharges water pumped from the impeller chamber 35 against the bottom wall 47 of the inner tube 46. As water flows through the accelerator means 66, air is aspirated into the water flow so that an air-water mixture passes through the impeller chamber and then downwardly into the bottom of the inner tube 46. The forceful impingement of the air-water mixture against bottom wall 47 at 58 causes vigorous frothing or bubbling of the air-water mixture and production of agitated air bubbles which rise upwardly and overflow into the water contained in the outer container 45 above the top of the inner tube 46. Water flow in the outer container 45 becomes relatively slow because of the increased flow area at the top of container 45 so that air bubbles emerging from the top end of inner tube 46 may rise and break through water surface 79 and into the air plenum chamber 78. Substantially all of the air bubbles are released from the water at surface 79. Continuous circulation of water and the air-water mixture with release of air in the separation chamber and the continuous introduction of more air into the water through the accelerator means 66 produces a collection of air increasing in pressure in the air plenum chamber 78. Such pressure air is released through the lines 52, 23 connecting the apparatus 20 to the aquarium tank.

Apparatus embodying the construction and mode of operation described above and using the March centrifugal pump Model AC-2CB-MD has pumped air against pressures of 440 pounds per square foot (3 psi). In one exemplary operation such an air pumping apparatus has pumped air against and into a column of water having a seven foot head.

The air-separation means 32 provides an active agitated reservoir for the pumped water in which the flow rate of water through the outer annular chamber downwardly to the outlet 61 is sufficiently slow so that the air bubbles emerging from the inner tube have sufficient time to escape from the body of water located above the top open end 48 of the inner tube and from the water level 79. The water flow at the bottom of the outer container 45 through the outlet port 61 becomes accelerated through the accelerating means 66 for introduction of air and an air-water mixture through the inlet pipe portion 60 to the impeller chamber where a selected flow rate of water is maintained to provide the desired impingement action and frothing of the water in the inner tube 46.

It will be understood that while the terms "air" and "water" have been used in the above description of the invention for the purpose of aerating water in an aquarium tank, the terms "air" and "water" include "gas" and "liquids". The air separation means of this invention as described cleanses by water any air borne pollutants which may have passed through the mechanical filter means 72. Thus, with certain types of gases and liquids it may be possible by the apparatus and method of this invention to free gases of certain pollutants and deliver such pollutant-free gas under pressure to a desired location for uses other than aerating water in an aquarium tank.

Since the amount of water in the closed circulating system is constant and water is virtually non-compressible, a substantial air pressure may be developed in the gas plenum chamber 78. The amount of pressure developed in chamber 78 will depend upon the motor driven centrifugal pump; pumps of greater capacity and rate of flow will cause additional air to be aspirated into the system and will also cause more agitated frothing of the gas-liquid mixture in the inner tube 46 for release of more air into the plenum chamber.

When the air pumping apparatus of this invention is used to aerate a body of water in an aquarium tank, the oxygen level of the air entering the aquarium tank may be readily increased by the addition of small amounts of hydrogen peroxide to the air-water mixture. Such hydrogen peroxide flowing in the closed water circulation path described above will increase the amount of oxygen released to the plenum chamber 78 and ultimately to the aquarium tank.

The advantages of the above described air pumping apparatus will be readily apparent to those skilled in the art. The air pumping apparatus of this invention will not lose air pressure over the life of the system because of the manner in which the pressure air is produced. The air pumping apparatus of this invention will deliver a large volume of air which has been mechanically and water stripped free of most pollutants carried by air. Because of the arrangement for pumping an air-water mixture through an impeller chamber in which the impeller is sealed from the motor means it will be apparent that the air-water mixture is virtually free from contamination by parts of the pumping apparatus. The apparatus is compact, light weight, quiet compared to piston driven air pumps, and is relatively inexpensive to make. The air pumping apparatus described above does not utilize pistons, diaphragms, bellows or high speed rotary vanes which directly contact air being pumped.

Since the air pumping apparatus includes continuous circulation of unchanged water supply, it will be understood that the pollutants stripped from the air by the water will accumulate in the water and periodically the water should be drained and replaced when it becomes dirty.

In the present embodiment, the air inlet means is shown in the pipe portion 60 leading to the inlet port of the water pump means. The air inlet means and accelerating system may be located downstream from the outlet port of the water pump means if desired.

Various changes and modifications may be made in the air pump means and method described above which come within the spirit of this invention and all such changes coming within the scope of the appended claims are embraced thereby.

I claim:

1. In a method of providing virtually unpolluted air to a remote body of water for aeration thereof, the steps of:
   providing a reservoir of water of selected fixed quantity and an air pressure chamber having a volume defined by the water level of the water reservoir;
   providing an uninterrupted unbroken path for continuous circulation of said fixed quantity of water, said path including pumping inlet and outlet path portions and said reservoir;
   introducing air into the pumping path portion to provide an air-water mixture;
   pumping the air-water mixture into the reservoir below its water level to cause frothing of said air-water mixture and separation of the air therefrom to accumulate cleansed air under pressure in said pressure chamber;
   and conducting said pressure air from said air chamber to said remote body of water for introduction therein at a selected point for aeration of said remote body of water.

2. In a method as stated in claim 1 including the step of:
   impinging the air-water mixture against a wall of said reservoir opposite from said air chamber.

3. A method as stated in claim 1 wherein the step of introducing air into the pumping path portion includes:
   accelerating flow of said water to aspirate air into said water at the vicinity of acceleration of said water.

4. In an apparatus for treating and pumping air under pressure into a body of water in an aquarium tank provided with an air inlet below the water level, the combination of:
   a water pump means having an inlet port and an outlet port;

an air-water separation and air cleansing means comprising:

an inner upright tube providing an inner chamber closed at the bottom and having a top open end, an outer upright container for the inner tube and having a cross-sectional area greater than that of the tube and defining an annular chamber with the inner tube, extending above the inner tube, and having a top wall spaced from the open top end of the inner tube;

said top wall having an outlet fitting adapted to be connected with said air inlet of the aquarium tank;

pipe means interconnecting the outlet port of the pump means with the inner chamber of the inner tube below the top of the inner tube, and the outer annular chamber with the inlet port of the water pump means;

said inner and outer chambers, said pipe means, and said pump means containing a fixed unchanging quantity of water, the level of water in the outer container covering the top open end of the inner tube and spaced from said top wall to provide an air accumulation chamber defined by said water level and said top wall;

an air inlet means in said pipe means to provide an airwater mixture;

whereby discharge of the air-water mixture into the inner chamber below the top of the inner tube and forcibly directed against the bottom of the inner tube causes a frothing of the mixture in the inner chamber which rises to the water level and releases water cleansed air into said air accumulation chamber and to provide air under pressure therein for communication to said air inlet at said aquarium tank;

said air inlet means including means to accelerate flow of water in the pipe means.

5. Means for separation and purification of a gas from a liquid in which the gas is transported, including in combination;

outer receptacle means including a bottom wall, a top wall, and side walls defining a chamber;

an inner receptacle within said chamber including a hollow member having a side wall, a closed bottom wall defining an inner chamber and an open top spaced from the top wall of the outer receptacle;

an inlet pipe extending through said side walls of the outer and inner receptacles to the interior of said inner chamber and spaced from said bottom wall of said inner receptacle a distance for forceably impinging flow of a gas-liquid mixture against said bottom wall and for filling said inner and outer chambers to a liquid level above the open top of said inner receptacle;

an outlet pipe including an outlet port for liquid from which gas has been removed in the side wall of said outer receptacle;

an outlet fitting for gas in the top wall of said receptacle;

said outer receptacle, inner receptacle, inlet pipe, containing a fixed unchanging quantity of liquid;

means for pumping and circulating said fixed quantity of liquid containing gas continously in an uninterrupted unbroken path into said inner chamber through said inlet pipe at a flow rate to cause frothing of said gas-liquid mixture in said inner chamber and separation of the gas from said liquid into the space between said top wall of said outer receptacle and said liquid level for accumulating gas under pressure in said space and for discharging said gas under pressure through said outlet fitting in said top wall and a gas inlet means in said outlet pipe upstream from said pump means.

6. In a means as stated in claim 5 including liquid accelerator means upstream from said pumping means and between said pumping means and said outlet port for accelerating flow of liquid to said pump means.

7. Means as stated in claim 6 including means for introducing air into said liquid upstream from said pumping means and at said accelerator means.

* * * * *